No. 818,532. PATENTED APR. 24, 1906.
J. N. FRAME.
CORN PLANTER.
APPLICATION FILED FEB. 19, 1906.

WITNESSES:

Joseph N. Frame  INVENTOR
By C. A. Snow & Co
ATTORNEYS

UNITED STATES PATENT OFFICE.

JOSEPH N. FRAME, OF LEWISTOWN, MISSOURI.

CORN-PLANTER.

No. 818,532.　　　Specification of Letters Patent.　　　Patented April 24, 1906.

Application filed February 19, 1906. Serial No. 301,899.

*To all whom it may concern:*

Be it known that I, JOSEPH N. FRAME, a citizen of the United States, residing at Lewistown, in the county of Lewis and State of Missouri, have invented a new and useful Corn-Planter, of which the following is a specification.

This invention relates to corn-planters; and it has for its objects to simplify the construction and operation of this class of machines and to provide simple and improved means whereby the seed-dropping mechanism may be operated direct from the axle of the machine through the medium of a simple connecting-rod and without the intervention of chains or similar connecting means, thereby insuring certainty, accuracy, and effectiveness of operation.

With these and other ends in view, which will readily appear as the nature of the invention is better understood, the same consists in the improved construction and novel arrangement and combination of parts which will be hereinafter fully described, and particularly pointed out in the claim.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

Figure 1:
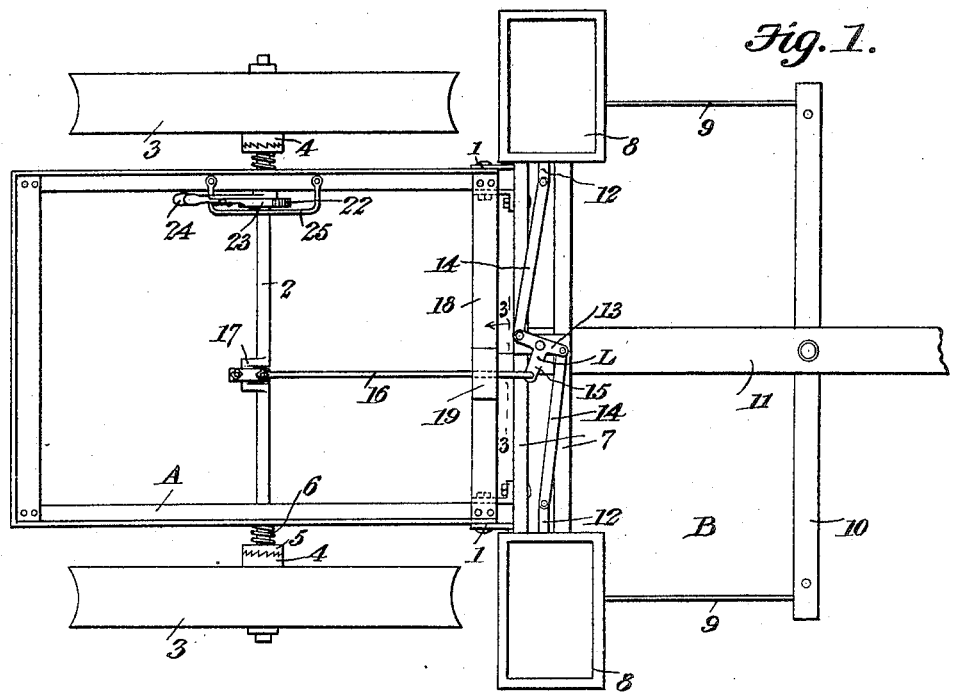
Figure 3:
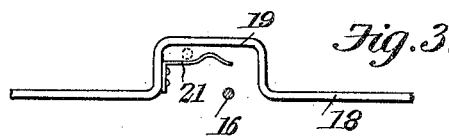
Figure 2:
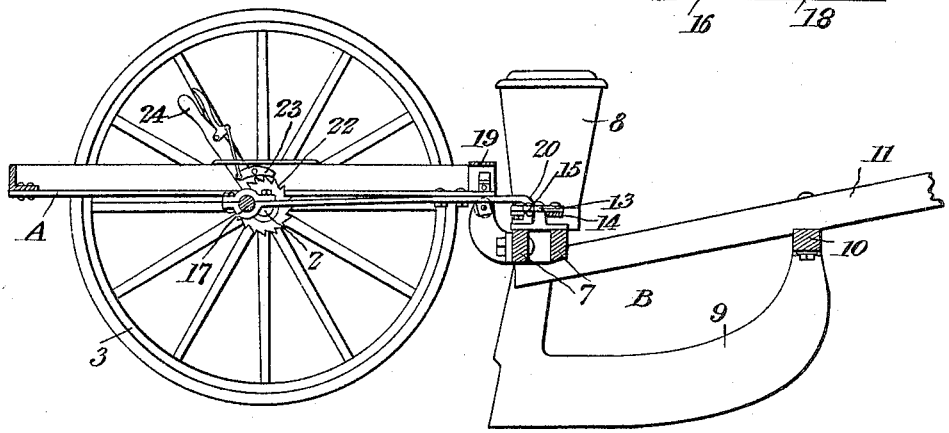

In the drawings, Figure 1 is a top plan view of a corn-planter constructed in accordance with the principles of the invention. Fig. 2 is a longitudinal vertical sectional view of the same, and Fig. 3 is a sectional detail view taken on the plane indicated by the line 3 3 in Fig. 1.

Corresponding parts in the several figures are indicated throughout by similar characters of reference.

The improved corn-planter of the present invention includes a main wheel or wheel-frame A and a runner-frame B, said frames being hingedly connected with each other in the usual well-known manner, as indicated at 1.

The wheel-frame A is provided with bearings for the rotary axle 2, having the carrying-wheels 3 3, the hubs of the latter being provided with clutch members 4, adapted for engagement with clutch members 5, which are slidably mounted upon the axle and which are held in engagement with the clutch members 4, as by means of suitably-arranged springs 6. By this clutch mechanism when the machine travels in a forward direction and the carrying-wheels are rotated in a forward direction rotary motion will be communicated to the axle, the latter remaining stationary when the machine is being backed.

The runner-frame includes the cross-bars 7, supporting the hoppers or seedboxes 8 8, from which the runners 9 extend forwardly to the front cross-bar 10. A tongue 11 is suitably connected with the runner-frame. The seed mechanism includes the seed-slides 12, which are supported for reciprocatory movement transversely of the seedboxes. Said seed-slides are operated by means of a T-lever L, two arms of which, 13, are connected by means of links 14 with the slides 12. The third arm, 15, of the T-lever is connected by a pitman 16 with a crank 17 upon the axle, from which motion will thus be transmitted to the T-lever and through the latter to the seed-slides.

The front cross-bar 18 of the main frame A is provided with an arch 19 for the passage of the pitman 16, which latter is provided at its front end with a hook 20, detachably engaging the arm 15 of the T-lever. The arch 19 supports a spring-catch 21, which is adapted to support the pitman 16 when the latter is disconnected from the lever L, as will be best seen by reference to Fig. 3 of the drawings. The operation of the seed-dropping mechanism may be at any time suspended by simply disconnecting the pitman 16 from the lever-arm 15 and placing the pitman upon the spring-catch or supporting member 21, where it will be free to reciprocate when the axle revolves without in any way effecting the position of the lever L or the seed-dropping mechanism.

The axle 2 of the machine has been shown as provided with a ratchet-wheel 22, adapted to be engaged by a spring-actuated pawl 23, connected with an operating-lever 24, which latter is confined in a keeper 25, connected with the main frame of the machine. By manipulating this lever the axle will be partially rotated at the starting of a row for the purpose of adjusting the seed-dropping mechanism to commence operations at precisely the desired point. Marking devices of ordinary well-known construction are to be used in connection with this improved planter; but such devices are well known in the art, and inasmuch as they are no part of the present invention it is not considered necessary to describe the same.

From the foregoing description, taken in connection with the drawings hereto annexed, the operation and advantages of this invention will be readily understood.

The construction of the improved machine is extremely simple, and it is therefore inexpensive and not liable to get out of order. At the same time the construction is such as to insure absolute accuracy and regularity in the dropping or depositing of the charges of the seed.

When the machine is being moved from one place to another or when for any reason it shall be desired to temporarily suspend the planting operation, the pitman 16 is disconnected from the seed-slide-operating lever L, which latter will thus remain stationary. When the pitman is in engagement with the lever at the starting of the row, the axle may be partially rotated by means of the lever 24, so as to adjust the seed-dropping mechanism to the required position for starting.

Having thus described the invention, what is claimed is—

In a corn-planter, a main frame, an axle connected therewith for rotation, carrying-wheels upon the axle, spring-actuated clutch devices for locking said wheels upon the axle for rotation in one direction, means for rotating the axle independently of the wheels, a crank upon the axle, a runner-frame hingedly connected with the main frame, reciprocatory seed-slides upon the runner-frame, a T-lever pivoted upon the latter, links connecting two arms of said lever with the seed-slides, a pitman connecting the crank upon the axle detachably with the third arm of the T-lever, and means for supporting said pitman in inoperative position.

In testimony that I claim the foregoing as my own I have hereto affixed my signature in the presence of two witnesses.

JOSEPH N. FRAME.

Witnesses:
J. W. BARNES,
J. H. LILLARD.